United States Patent
Eda et al.

(10) Patent No.: US 10,140,163 B2
(45) Date of Patent: Nov. 27, 2018

(54) INTELLIGENT FRAMEWORK FOR SHARED SERVICES ORCHESTRATION

(71) Applicant: International Business Machines Corporation, Armonk, NY (US)

(72) Inventors: Sasikanth Eda, Vijayawada (IN); Varun Mittal, Zirakpur (IN); Sachin C. Punadikar, Pune (IN); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 14/796,471

(22) Filed: Jul. 10, 2015

(65) Prior Publication Data

US 2017/0012897 A1    Jan. 12, 2017

(51) Int. Cl.
| | |
|---|---|
| H04L 12/911 | (2013.01) |
| G06F 9/50 | (2006.01) |
| H04L 29/08 | (2006.01) |
| H04L 29/06 | (2006.01) |

(52) U.S. Cl.
CPC ............ G06F 9/5077 (2013.01); H04L 67/10 (2013.01); H04L 67/1097 (2013.01); H04L 67/42 (2013.01)

(58) Field of Classification Search
CPC ...... H04L 47/781; H04L 67/10; G06F 9/5077
See application file for complete search history.

(56) References Cited

U.S. PATENT DOCUMENTS

| | | | |
|---|---|---|---|
| 8,238,256 B2 | 8/2012 | Nugent | |
| 8,631,458 B1 | 1/2014 | Banerjee | |
| 8,676,593 B2 | 3/2014 | Nagpal et al. | |
| 2007/0106808 A1* | 5/2007 | Vemula | H04L 12/1859 709/230 |
| 2008/0082476 A1* | 4/2008 | Mourra | G06F 8/65 |
| 2009/0019008 A1* | 1/2009 | Moore | G06Q 30/02 |
| 2012/0303776 A1* | 11/2012 | Ferris | G06F 9/5072 709/223 |

(Continued)

FOREIGN PATENT DOCUMENTS

| | | |
|---|---|---|
| WO | 2014039889 A1 | 3/2014 |

OTHER PUBLICATIONS

Sanders, James; "Cyberattackers can reprogram hard drive firmware, according to Kaspersky bulletin"; TechRepublic; Feb. 18, 2015; © 2015, CBS Interactive; pp. 1-8, <http://www.techrepublic.com/article/cyberattackers-can-reprogram-hard-drive-firmware-according-to-kaspersky-bulletin/.

(Continued)

*Primary Examiner* — Tauqir Hussain
*Assistant Examiner* — Jsing Forng Lin
(74) *Attorney, Agent, or Firm* — Alexander G. Jochym; Brian M. Restauro

(57) ABSTRACT

Aspects of the present invention disclose a method for optimizing shared services orchestration. The method includes one or more computer processors receiving resource requirements from a client. The method further includes one or more computer processors determining a list of rules. The method further includes one or more computer processors determining at least one resource based on the resource requirements and the list of rules. The method further includes one or more computer processors deploying at least one resource from the determined at least one resource.

16 Claims, 5 Drawing Sheets

(56) References Cited

U.S. PATENT DOCUMENTS

| | | | |
|---|---|---|---|
| 2012/0323806 A1* | 12/2012 | Abrams | G06Q 10/063 |
| | | | 705/317 |
| 2013/0298230 A1 | 11/2013 | Kumar et al. | |
| 2014/0101655 A1 | 4/2014 | Brant et al. | |
| 2014/0201737 A1* | 7/2014 | Mitkar | G06F 9/461 |
| | | | 718/1 |
| 2015/0234671 A1* | 8/2015 | Tomita | G06F 9/45558 |
| | | | 718/1 |
| 2016/0139938 A1* | 5/2016 | Dimitrakos | G06F 9/44505 |
| | | | 718/100 |
| 2017/0031707 A1* | 2/2017 | Mitkar | G06F 9/461 |

OTHER PUBLICATIONS

"A "Cloud Sourcing" System that Recommends the Pptimal Resource Configuration Based on a Cloud Workload's Attributes"; An IP.com Prior Art Database Technical Disclosure; IPCOM000236263; Electronic Publication: Apr. 15, 2014; pp. 1-5.

* cited by examiner

INTELLIGENT FRAMEWORK FOR SHARED SERVICES ORCHESTRATION

BACKGROUND OF THE INVENTION

The present invention relates generally to the field of cloud orchestration, and more particularly to cloud orchestration with consideration to geography and applicable legislation, rules, and regulations.

Cloud orchestration may be described as the manual or automated arrangement, coordination and management of complex computer systems, middleware and services. In more simple terms, cloud orchestration is assigning and managing resources such as databases, hypervisors, architectures, operating systems, and applications, to perform a function over the internet. The resources may be assigned based on cost, availability and service level agreements (SLA) between a client and a cloud provider. In this scenario, it is left to either the cloud provider or an automatic orchestration tool (i.e., cloud orchestrator) to select the resources for the cloud computing system and it is incumbent on the provider to select the proper resources. This process may lead to instances where cloud resources, which violate laws, rules or regulations, are deployed for a client and this may result in unintended negative consequences for both the client and the cloud provider.

United States Patent Application Publication 2012/0303776 A1, titled Methods and Systems for Data Compliance Management Associated with Cloud Migration Events states the following: "A compliance tool can verify compliance with jurisdictional transfer and storage requirements for data migration into or within a cloud. The compliance tool can monitor and check data transfers and storage to determine if the data transfer and/or storage will cross jurisdictional boundaries. If the transfers or storage crosses jurisdictional boundaries, the compliance tool can identify the transfer and storage requirements of any jurisdictions involved with the transfer and/or storage. The compliance tool can verify that the data transfers complies with the identified transfer and storage requirements. If the data transfer and/or storage does not comply with the identified transfer and storage requirements, the compliance tool can terminate the data transfer and/or storage, modify the data transfer and/or storage, and/or modify the data, itself to comply with the identified transfer and storage requirements." This publication concerns compliance of data migration in a cloud but neglects rules and regulations regarding the cloud infrastructure itself.

SUMMARY

Aspects of the present invention disclose a method for optimizing shared services orchestration. The method includes one or more computer processors receiving resource requirements from a client. The method further includes one or more computer processors determining a list of rules. The method further includes one or more computer processors determining at least one resource based on the resource requirements and the list of rules. The method further includes one or more computer processors deploying at least one resource from the determined at least one resource. An advantage of this method of optimized orchestration is the inclusion of client requirements and applicable rules which may affect the orchestration.

In another aspect, a method for optimizing shared services orchestration includes determining whether a list of rules has changed. The method also includes sending an alert in response to determining that the list of rules has changed. An advantage of this method is that the client requiring resources and the provider of resources are notified of rule changes.

In yet another aspect, a computer program product includes program instructions to optimize shared service orchestration. The computer program product also includes program instructions to receive resource requirements from a client. The computer program product also includes program instructions to determine a list or rules. The computer program product also includes program instructions to determine at least one resource based on the resource requirements and the list of rules. The computer program product also includes program instructions to deploy at least one resource from the determined at least one resource. An advantage of this computer program product is the inclusion of client requirements and applicable rules which may affect the orchestration.

In yet another aspect, a computer program product includes program instructions to determine whether a list of rules has changed. The computer program product also includes program instructions to send an alert in response to determining that the list of rules has changed. An advantage of this computer program product is that the client requiring resources and the provider of resources are notified of rule changes.

In yet another aspect, a computer system includes program instructions to optimize shared service orchestration. The computer system also includes program instructions to receive resource requirements from a client. The computer system also includes program instructions to determine a list or rules. The computer system also includes program instructions to determine at least one resource based on the resource requirements and the list of rules. The computer system also includes program instructions to deploy at least one resource from the determined at least one resource. An advantage of this computer system is the inclusion of client requirements and applicable rules which may affect the orchestration.

In yet another aspect, a computer system includes program instructions to determine whether a list of rules has changed. The computer system also includes program instructions to send an alert in response to determining that the list of rules has changed. An advantage of this computer system is that the client requiring resources and the provider of resources are notified of rule changes.

DETAILED DESCRIPTION

Figure 1:
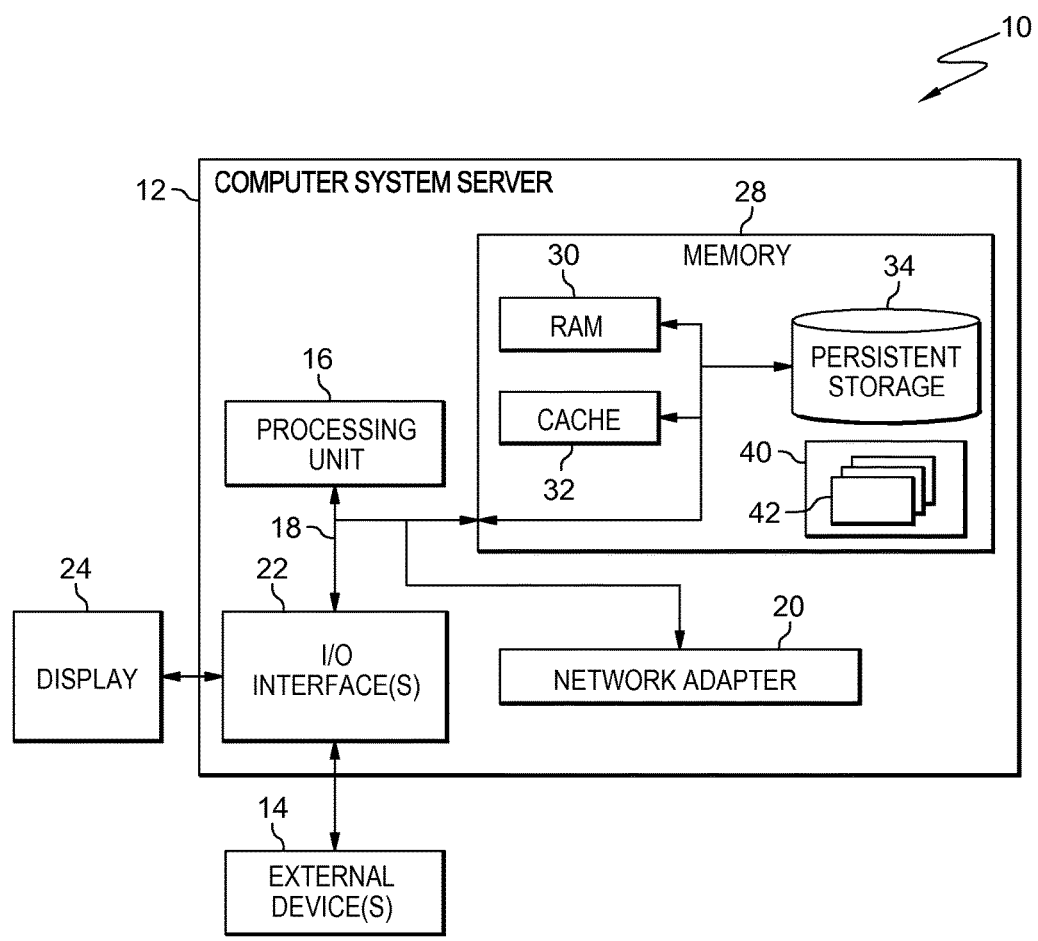
FIG. 1 depicts a cloud computing node according to an embodiment of the present invention.

Some embodiments of the present invention recognize that current orchestration of shared services (i.e., cloud orchestration) is built based on the primary principle of maximizing the usage of the shared resources. In other words, the orchestrator selects resources across geographies based on resource availability, network efficiency, location relative to the client, readiness of the hardware and software, etc. Orchestration done in this manner attempts to keep costs low for the client and profits high for the provider. With this maximization being the foremost criteria, other considerations during orchestration may be overlooked or even ignored which may lead to issues for both the client and provider.

Embodiments of the present invention offer a mechanism for optimizing standard cloud orchestration by taking rules and regulations into consideration when performing cloud orchestration. Rules may be required by at least one of the following: the locality of the client; the locality of the cloud provider; law; the client; the cloud provider; an organization involved with the client or cloud provider; a partner of the client or cloud provider; a governing body (e.g., board of directors, board of governors, etc.) for the client; etc. The rules may be based on the client's or locality's preference for hardware manufacturers or the citizenship of the software developer or software seller. The optimizer program may have access to a repository which includes information regarding rules and regulations that may need to be followed by a client or by the cloud provider. These rules and regulations may be input manually or may be gleaned from social media, news sources, and the like. Based on the identified rules and regulations, the optimizer program may display possible resources, and their associated citizenship (who developed the resource, where it was developed, etc.) for manual orchestration. The optimizer program may also include an auto orchestration feature which also may take into account the rules and regulations requirements. Another feature of the optimizer program may be the ability to periodically check for any updated or newly issued rules and regulations for a client and based on the client's preferences, either auto-correct or a suggest to the client how to comply with the new rules and regulations. Yet another feature of the optimizer program may be an auto-triggered alert for any rules and regulations violations. This alert may be sent to a client or cloud provider even when the optimizer program corrects the violation. The triggers for the alerts may be grouped into three categories: hardware; software; and internal services.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. The present invention will now be described in detail with reference to the Figures.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
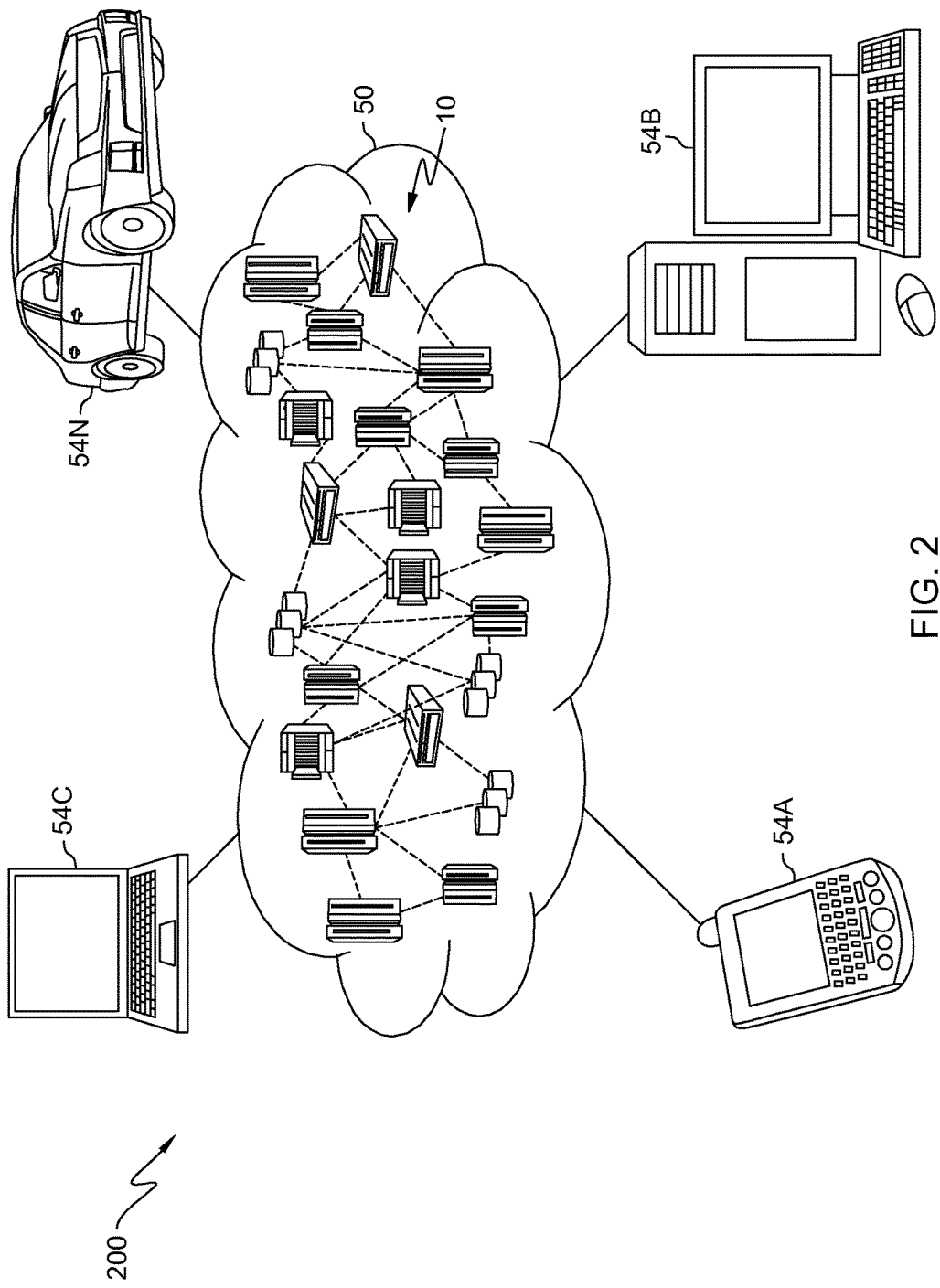
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
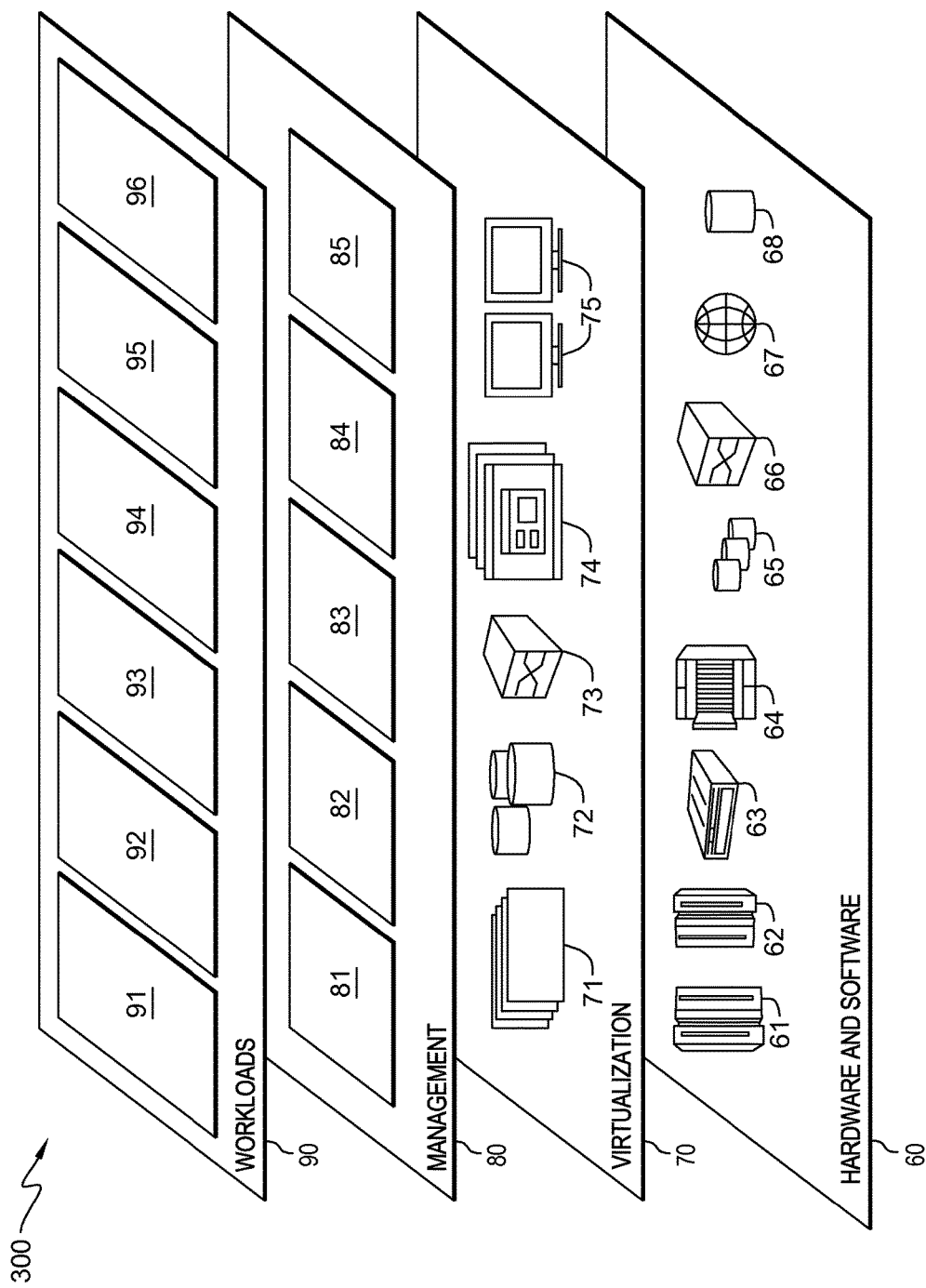
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resource optimizer 96.

Figure 4:
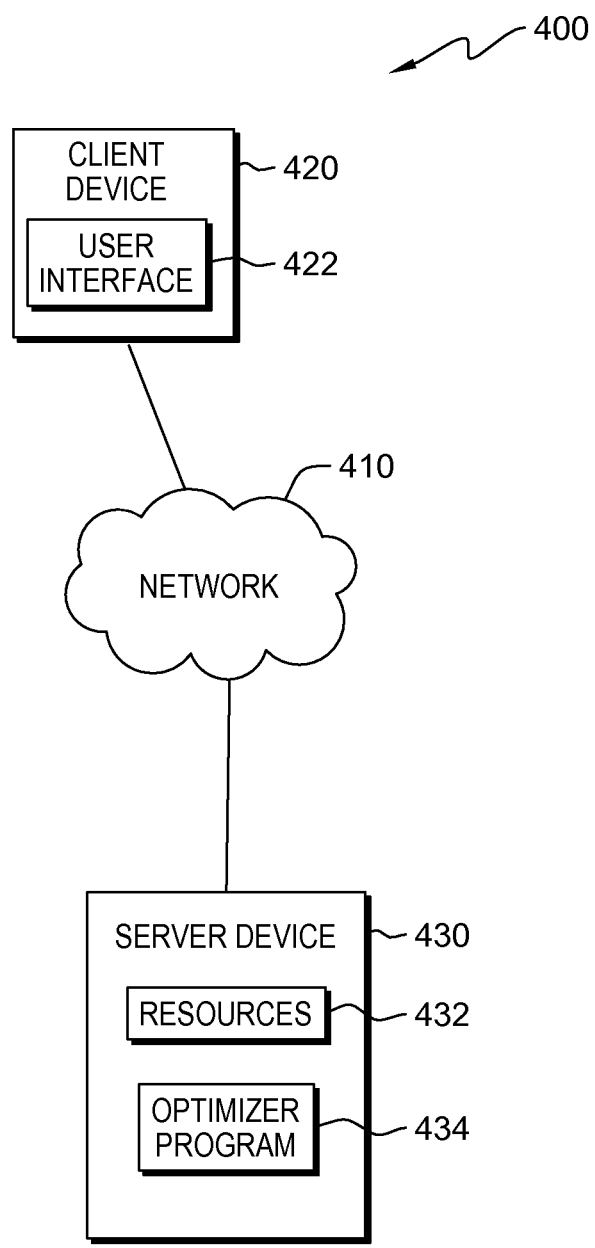
FIG. 4 depicts a functional block diagram of a computing environment in accordance with an embodiment of the present invention.

FIG. 4 is a functional block diagram illustrating a computing environment, generally designated 400, in accordance with one embodiment of the present invention. FIG. 4 provides only an illustration of one implementation and does not imply any limitations with regard to the systems and environments in which different embodiments may be implemented. Those skilled in the art may make many modifications to the depicted embodiment without departing from the scope of the invention as recited by the claims.

An embodiment of computer environment 400 includes client device 420 and server device 430 interconnected over network 410. Computer environment 400 may include other computing devices not shown, such as processors, hard drives, read only memory, random access memory, displays, tablet computers, laptop computers, desktop computers, computer servers, or any other computer systems known in the art.

In example embodiments, client device 420 may connect to network 410 which enables client device 420 to access other computing devices and/or data not directly stored to client device 420. Network 410 may be a local area network (LAN), a telecommunications network, a wide area network (WAN) such as the Internet, or any combination of the three, and include wired, wireless or fiber optic connections. In general, network 410 can be any combination of connections and protocols that will support communications between client device 420, server device 430, and other computing devices, in accordance with embodiments of the present invention.

In example embodiments, client device 420 can be a tablet, laptop, or netbook personal computer (PC), a desktop computer, a personal digital assistant (PDA), a smartphone, or any programmable electronic device capable of communicating with any computing device within computer environment 400. In certain embodiments, client device 420 collectively represents a computer system utilizing clustered computers and components (e.g., database server computers, application server computers, etc.) that act as a single pool of seamless resources when accessed by elements of computer environment 400, such as in a cloud computing environment. In general, client device 420 is representative of any electronic device or combination of electronic devices capable of executing computer readable program instructions. Client device 420 can include components as depicted and described in detail with respect to cloud computing node 10, as described in reference to FIG. 1, in accordance with embodiments of the present invention. Server device 430 is substantially similar to client device 420 and has substantially similar components. Client device 420 and server device 430 may be nodes that are part of cloud computing environment 50.

In an embodiment of the present invention, client device 420 includes user interface 422. User interface 422 provides an interface between client device 420 and a user of client device 420. User interface 422 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 422 may also be mobile application software that provides an interface between a user of client device 420 and server device 430. Mobile application software, or an "app," is a computer program designed to run on smart phones, tablet computers and other mobile devices. User interface 422 enables a user of client device 420 to access resources 432 and optimizer program (OP) 434 on server device 430.

Server device 430 includes resources 432 and OP 434. In various embodiments of the present invention, cloud providers may access server device 430 over network 410 in order to allocate resources 432 using OP 434.

According to various embodiments of the present invention, resources 432 is a collection of hardware and software components used in cloud computing and other computing environments. In order to achieve the desired economies of scale, cloud computing relies on sharing these resources among various clients. In addition to being shared by multiple clients, the resources may be dynamically reallocated based on client demand. The following types of hardware and software components may be included in resources 432: servers and associated components such as processors and memory; databases; hypervisors; architectures; operating systems; applications; firmware; and interconnects.

In an embodiment of the present invention, OP 434 is the software application, program, or subprogram of a larger program that allocates resources 432 for creating a cloud computing environment while taking rules and regulations into consideration. Resources may be allocated to a single client in a private cloud or they may be allocated for general use in a public cloud. In one embodiment, OP 434 may be a stand-alone program. In another embodiment, OP 434 may be included in a standard cloud orchestrator. In various embodiments, the rules and regulations to consider may be provided by the client, the cloud provider, both entities, or be legislated by local, state or federal law. Examples of rules and regulations may include the following: a client may not want the client's data available on the same resources as a competitor's data; legislation in country 'A' may prohibit hardware and/or software resources owned by or developed in country 'B' being used by clients residing in country 'A'; a client, for personal reasons, may not want to financially support hardware and/or software vendors from country 'C'; etc.

Figure 5:
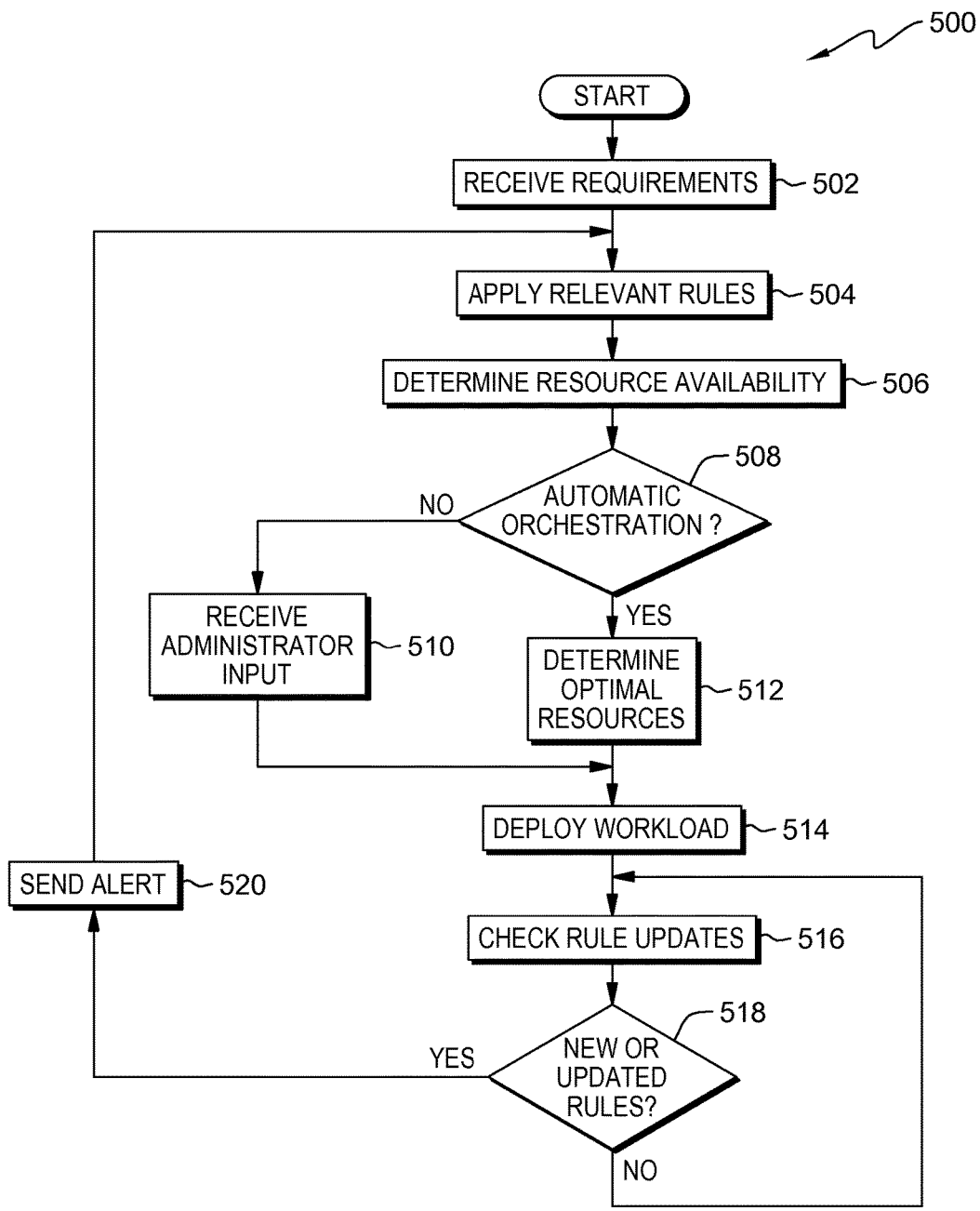
FIG. 5 depicts a flowchart of operational steps of a program for optimizing cloud computing resources, based on required rules and regulations, in a cloud environment in accordance with an embodiment of the present invention.

FIG. 5 is a flowchart of workflow 500 depicting operational steps for optimizing cloud computing resources based on required rules and regulations. Workflow 500 represents the operational steps to execute resource optimizer 96 in workloads layer 90 in FIG. 3. In a preferred embodiment, optimizer program 434 initiates from a standard cloud orchestrator program performing auto orchestration. In an alternative embodiment, OP 434 initiates by a client via user interface 422 on client device 420. In yet another embodiment, OP 434 initiates via a cloud provider performing manual orchestration.

OP 434 receives requirements (step 502). In other words, OP 434 receives the client resource requirements for the desired cloud computing environment. In one embodiment, the client may input the requirements via user interface 422 on client device 420. In an example, a client indicates to a cloud provider that the client requires five gigabytes of RAM, a minimum of a dual-core processor, 1 terabyte of memory and the resources be located in country 'A' and/or country 'B'. In other embodiments, the client may speak directly to the cloud provider or the client may create a Service Level Agreement (SLA) with a cloud provider. An SLA is a contract between a service provider and its internal or external customers that documents what services the provider will furnish to the client. SLAs measure the service provider's performance and quality in a number of ways including the following: availability and uptime (i.e., the percentage of time the services will be available); number of concurrent users that may be served; specific performance benchmarks; application response time; help desk response time; etc.

OP 434 applies relevant rules (step 504). In other words, OP 434 compares the client requirements received in step 502 against known rules and regulations that may affect the client's request. The rules determine the allowable resources that may be used. This group of allowable resources is a subset of all of the possible resources that may constitute the cloud environment. For example, if there is a total of one hundred possible resources, fifty of those resources may be allowable. In one embodiment, the rules include certain client requirements regarding the location of resources. For example, the client requests to use resources housed only country 'A' and/or country 'B'. In another embodiment, the rules may be legislated by law. For example, U.S. Federal law may state that no U.S. based company may use software written or maintained in countries 'X', 'Y', and 'Z'. In an embodiment, the cloud provider inputs the rules and regulations to OP 434. In another embodiment, OP 434 automatically collects the rules and regulations via scanning online sources such as news outlets, social media sites, government websites, and the like.

OP 434 determines resource availability (step 506). In other words, based on the results of steps 502 and 504, OP 434 determines the available resources which meet the specified requirements, rules and regulations of the desired cloud computing environment. This group of available resources is a subset of the allowable resources. For example, of the fifty allowable resources, twenty of them may be available. In an embodiment of the present invention, OP 434 queries resources 432 on server device 430 for the resource attributes. For example, OP 434 reviews resource attributes such as: country of origin; country of maintenance; country of residence; technical capability (e.g., amount of RAM, amount of standard memory, processor speed, software version level, etc.); date of manufacture; number of clients currently utilizing the resource; etc. Based on the attribute review, OP 434 determines which resources meet the specified requirement, rules and regulations.

OP 434 determines whether to perform automatic orchestration (decision step 508). In other words, OP 434 receives input from a cloud provider whether to perform automatic orchestration. In various embodiments of the present invention, the input may come directly from the client (e.g., the client specifies manual orchestration), the input may come directly from the cloud provider (e.g., the cloud provider uses automatic orchestration when possible), or the input may be pre-defined (e.g., manual orchestration is used for clouds with ten resources or less to choose from, automatic orchestration for more than ten resources to choose from). In one embodiment (decision step 508, NO branch), the input indicates that the orchestration will be manual; therefore, OP 434 proceeds to step 510. In another embodiment (decision step 508, YES branch), the input indicates that the orchestration will be automatic; therefore, OP 434 proceeds to step 512.

OP 434 receives administrator input (step 510). In other words, manual orchestration will be performed to create the cloud computing environment utilizing the resources determined by OP 434 in step 506. In one embodiment, a cloud administrator may indicate which previously identified resources in step 506 are to be used to create a cloud computing environment which meets the client's requirements and applicable rules and regulations. For example, the administrator may "drag and drop" an allowable database, hypervisor, architecture, operating system and necessary applications into a "workspace". In another embodiment, previously identified resources may be selected from a comprehensive list of resources to build the necessary cloud computing environment. For example, the administrator may select an allowable database, via a checkmark, from a list of all of the databases available to place into the workspace. In the same manner, a hypervisor, an architecture, an operating system and required applications may be selected.

OP 434 determines the optimal resources (step 512). In other words, based on considerations such as cost, reliability, performance, and the like, OP 434 determines the optimal resources. This group of optimal resources is a subset of the available resources. For example, of the twenty available resources, only ten may be optimal. In an embodiment of the present invention, OP 434 queries resources 432 on server device 430 for the resource attributes. For example, OP 434 reviews resource attributes such as: country of origin; country of maintenance; country of residence; technical capability (e.g., amount of RAM, amount of standard memory, processor speed, software version level, etc.); date of manufacture; number of clients currently utilizing the resource; etc. For example, in addition to utilizing software from country 'K', the balance of the required resources (databases, hypervisors, architectures, operating systems, applications, etc.) are determined based on considerations other than those required by the client or the law.

OP 434 deploys workload (step 514). In other words, OP 434 provisions the resources (determined in step 514) to execute the discrete capability or application(s) (i.e., the workload) requested by the client in the cloud. In various embodiments of the present invention, the deployment may occur in one or more of the following cloud types: private; community; public; and hybrid. For example, resources to host a website are deployed in a private cloud.

OP 434 checks for rule updates (step 516). In other words, OP 434 queries online sources such as news outlets, social media sites, government websites, and the like for changes to existing legislation which may be incorporated into an existing deployment. OP 434 may also query company websites to look for any client driven changes to their rules and regulations which may affect resource deployment. OP 434 may also be provided updated rules directly by the cloud provider; for example, the client may provide an updated SLA to the provider who in turn inputs the new requirements into OP 434. In one embodiment, OP 434 accesses websites of interest using network 410. For example, OP 434 accesses the Homeland Security website of the U.S. government to look for changes to federal law(s). In another example, OP 434 accesses the website of company 'G' to look for changes to their rules and regulations.

OP 434 determines whether new or updated rules, regulations or laws were found (decision step 518). In other words, OP 434 receives an indication from the determination made in step 518 that new or updated rules, regulations and/or laws are in place. In one embodiment (decision step 518, YES branch), new or updated information was found; therefore, OP 434 proceeds to step 520. In another embodiment (decision step 518, NO branch), no new or updated information was found; therefore, OP 434 proceeds to step 516 in order to continue monitoring for new or updated rules, regulations and/or laws.

OP 434 sends an alert (step 520). In other words, OP 434 has determined that new or updated rules, regulations and/or laws were found and OP 434 sends an alert regarding the new information. In one embodiment, the alert may be sent automatically to the client and/or the cloud provider. For example, OP 434 has learned of a change to federal law indicating that country 'D' has been added to the list of countries that U.S. companies may not purchase or use software from; OP 434 then sends a notice to both the client and cloud provider notifying them of the update. In this example, OP 434 also proceeds directly to step 504 in order to apply the updated law and to re-determine the resource availability. In another embodiment, OP 434 waits for an indication to incorporate the new or updated rules, regulations and/or laws from the client and/or the cloud provider prior to proceeding to step 504 and performing the re-determining of resources. In this example, the client and/or cloud provider make the final determination regarding when to apply the new or updated information to the workload deployment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for optimizing shared services orchestration, the method comprising:
    receiving, by one or more computer processors, computing resource requirements from a client;
    determining, by one or more computer processors, a list of rules from a plurality of entities;
    determining, by one or more computer processors, a first set of resources, wherein the first set of resources:
        satisfy the computing resource requirements; and
        comply with the list of rules from the plurality of entities;
    deploying, by one or more computer processors, the first set of resources;
    querying, by one or more computer processors, an online external resource for a change associated with the list of rules, wherein the online external resource is a website;
    updating, by one or more computer processors, the list of rules based on the change of the query;
    determining, by one or more computer processors, a location of the client;
    determining, by one or more computer processors, a second set of resources, based on the computing resource requirements, the first set of resources, the updated list of rules, and the location of the client; and
    deploying, by one or more computer processors, the second set of resources.

2. The method of claim 1, wherein the list of rules from the plurality of entities is selected from the group consisting of: rules of the client requiring resources; rules of a provider of the at least one resource; rules of a governing body; and rules of law.

3. The method of claim 1, wherein the determined first set of resources is selected from the group consisting of: servers; databases; hypervisors; architectures; operating systems; applications; firmware; and interconnects.

4. The method of claim 1, further comprising:
    determining, by one or more computer processors, whether the list of rules has changed; and
    in response to determining, by one or more computer processors, the list of rules has changed, sending, by one or more processors, an alert.

5. The method of claim 4, wherein the alert is sent to a location selected from the group consisting of: the client requiring resources and the provider of the at least one resource.

6. A computer program product for optimizing shared services orchestration, the computer program product comprising:
    one or more computer readable storage media; and
    program instructions stored on the one or more computer readable storage media, the program instructions comprising:
        program instructions to receive computing resource requirements from a client;
        program instructions to determine a list of rules from a plurality of entities;

program instructions to determine a first set of resources, wherein the first set of resources:
  satisfy the computing resource requirements; and
  comply with the list of rules from the plurality of entities;
program instructions to deploy the first set of resources;
program instructions to query an online external resource for a change associated with the list of rules, wherein the online external resource is a website;
program instructions to update the list of rules based on the change of the query;
program instructions to determine a location of the client;
program instructions to determine a second set of resources based on the computing resource requirements, the first set of resources, the updated list of rules and the location of the client; and
program instructions to deploy the second set of resources.

7. The computer program product of claim 6, wherein the list of rules from the plurality of entities is selected from the group consisting of: rules of the client requiring resources; rules of a provider of the at least one resource; rules of a governing body; and rules of law.

8. The computer program product of claim 6, wherein the determined first set of resources is selected from the group consisting of: servers; databases; hypervisors; architectures; operating systems; applications; firmware; and interconnects.

9. The computer program product of claim 6, further comprising program instructions, stored on the one or more computer readable storage media, to:
  determine whether the list of rules has changed; and
  in response to determining the list of rules has changed, program instructions to send an alert.

10. The computer program product of claim 9, wherein the alert is sent to a location selected from the group consisting of: the client requiring resources and the provider of the at least one resource.

11. A computer system for optimizing shared services orchestration, the computer system comprising:
  one or more computer processors;
  one or more computer readable storage media; and
  program instructions stored on the one or more computer readable storage media for execution by at least one of the one or more computer processors, the program instructions comprising:
    program instructions to receive computing resource requirements from a client;
    program instructions to determine a list of rules from a plurality of entities;
    program instructions to determine a first set of resources, wherein the first set of resources:
      satisfy the computing resource requirements; and
      comply with the list of rules from the plurality of entities;
    program instructions to deploy the first set of resources;
    program instructions to query an online external resource for a change associated with the list of rules, wherein the online external resource is a website;
    program instructions to update the list of rules based on the change of the query;
    program instructions to determine a location of the client;
    program instructions to determine a second set of resources based on the computing resource requirements, the first set of resources, the updated list of rules, and the location of the client; and
    program instructions to deploy the second set of resources.

12. The computer system of claim 11, wherein the list of rules from the plurality of entities is selected from the group consisting of: rules of the client requiring resources; rules of a provider of the at least one resource; rules of a governing body; and rules of law.

13. The computer system of claim 11, wherein the determined first set of resources is selected from the group consisting of: servers; databases; hypervisors; architectures; operating systems; applications; firmware; and interconnects.

14. The computer system of claim 11, further comprising program instructions, stored on the one or more computer readable storage media for execution by at least one of the one or more computer processors, to:
  determine whether the list of rules has changed; and
  in response to determining the list of rules has changed, program instructions to send an alert.

15. The computer system of claim 14, wherein the alert is sent to a location selected from the group consisting of: the client requiring resources and the provider of the at least one resource.

16. The method of claim 1, wherein the website is selected from the group consisting of a news outlet website, a social media website, a government website, and a company website.

* * * * *